United States Patent
Ribarich

(10) Patent No.: US 6,639,369 B2
(45) Date of Patent: Oct. 28, 2003

(54) ELECTRONIC DIMMABLE BALLAST FOR HIGH INTENSITY DISCHARGE LAMP

(75) Inventor: Thomas J. Ribarich, Laguna Beach, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 10/104,909

(22) Filed: Mar. 21, 2002

(65) Prior Publication Data
US 2002/0153849 A1 Oct. 24, 2002

Related U.S. Application Data
(60) Provisional application No. 60/277,636, filed on Mar. 22, 2001.

(51) Int. Cl.[7] .............................. G05F 1/00; H05B 4/16
(52) U.S. Cl. ........................................ 315/307; 315/224
(58) Field of Search ............................ 315/209 R, 219, 315/224, 247, 291, 307, DIG. 4, DIG. 7

(56) References Cited

U.S. PATENT DOCUMENTS

| 5,363,020 | A | * | 11/1994 | Chen et al. ............. 315/209 R |
| 5,381,077 | A | | 1/1995 | McGuire ..................... 315/247 |
| 5,416,387 | A | | 5/1995 | Cuk et al. .................... 315/209 |
| 5,604,411 | A | * | 2/1997 | Venkitasubrahmanian et al. ........................... 315/307 |
| 5,691,605 | A | * | 11/1997 | Xia et al. .................... 315/307 |
| 6,034,489 | A | * | 3/2000 | Weng .......................... 315/307 |
| 6,259,215 | B1 | | 7/2001 | Roman ........................ 315/307 |
| 6,486,616 | B1 | * | 11/2002 | Liu et al. .................... 315/291 |

* cited by examiner

Primary Examiner—Don Wong
Assistant Examiner—Minh D A
(74) Attorney, Agent, or Firm—Ostrolenk, Faber, Gerb & Soffen, LLP

(57) ABSTRACT

A dimmable electronic ballast for an HID lamp includes a rectifier stage for rectifying an AC input and providing a rectified DC output, a power factor correction stage for modifying a power factor of the AC input and for providing an increased voltage DC output from the rectified DC output, an electronic ballast control circuit for providing a driving signal comprising a pulse train for controlling a switching operation of an output switch stage driving the HID lamp; the output switch stage having at least one electronic switching element coupled to the increased voltage DC output for providing a pulsed power signal to the HID lamp to power the lamp, the electronic ballast control circuit having a feedback input comprising a signal related to the power dissipated by the HID lamp for maintaining the power at a desired level, the desired level being set by a dimming control input to the electronic ballast control circuit. The circuit provides high frequency power, typically above 50 kHz, to the HID lamp.

33 Claims, 5 Drawing Sheets

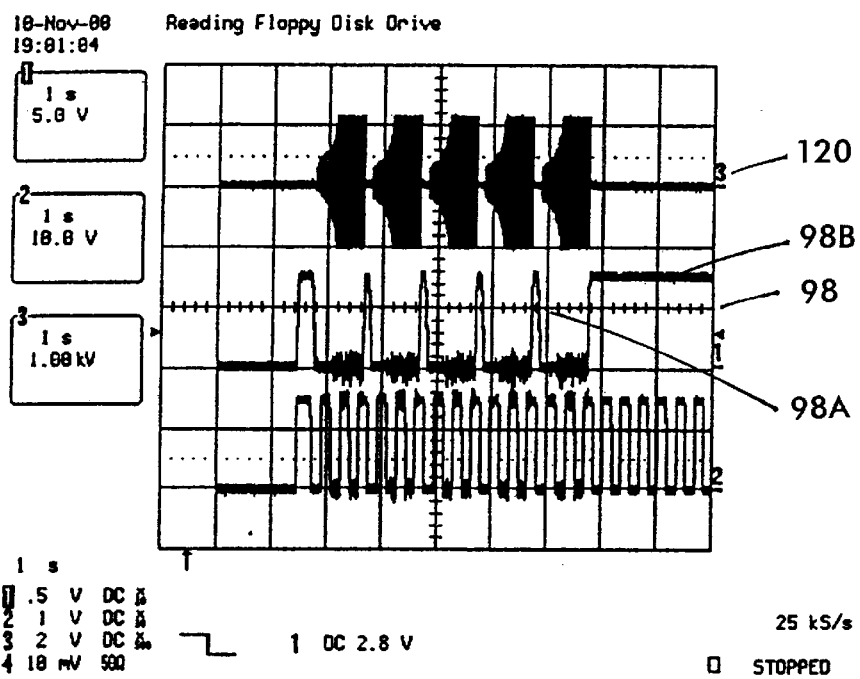
FIG. 3 Lamp Voltage, SD pin and pin 9 of 4060B during non-strike pulsing
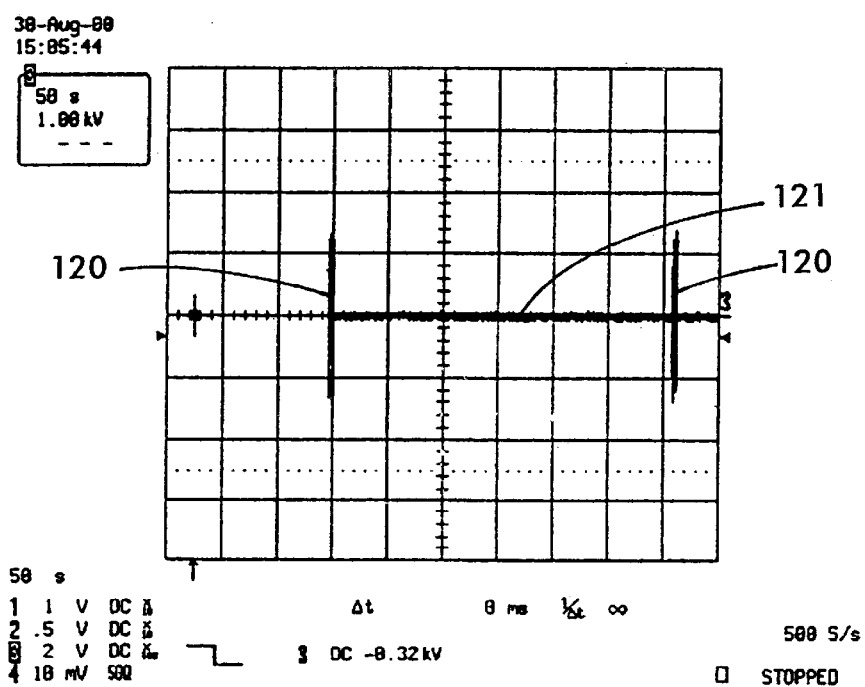
FIG. 4 Lamp Voltage during non-strike showing 5 minute wait between pulses

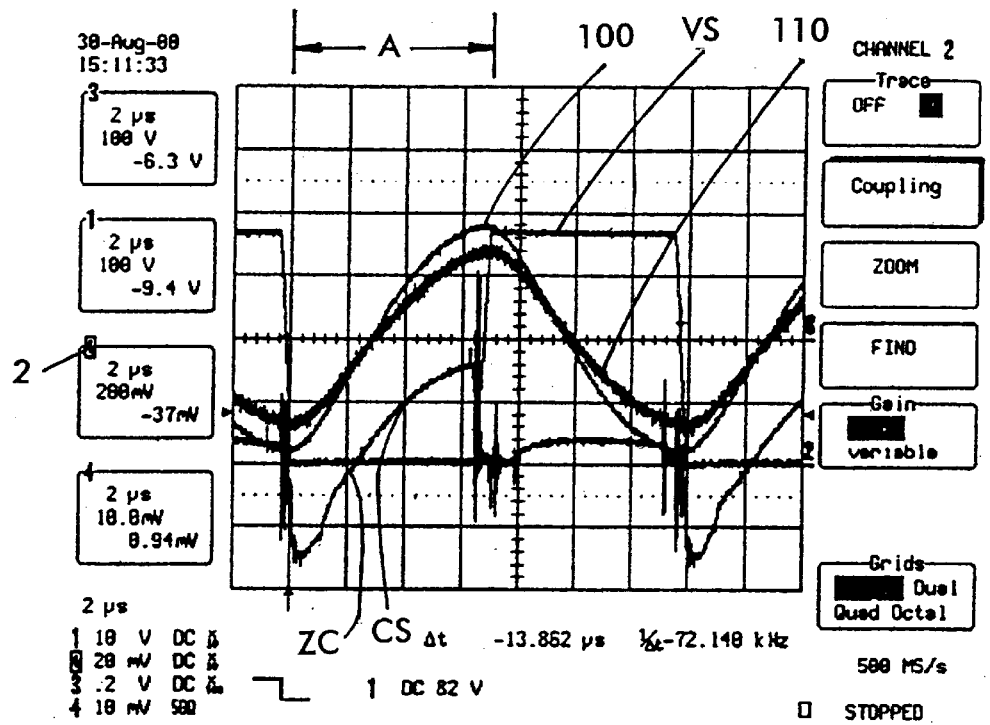
FIG. 5 Lamp Voltage, Lamp Current (1A/div), VS and CS during 100% brightness
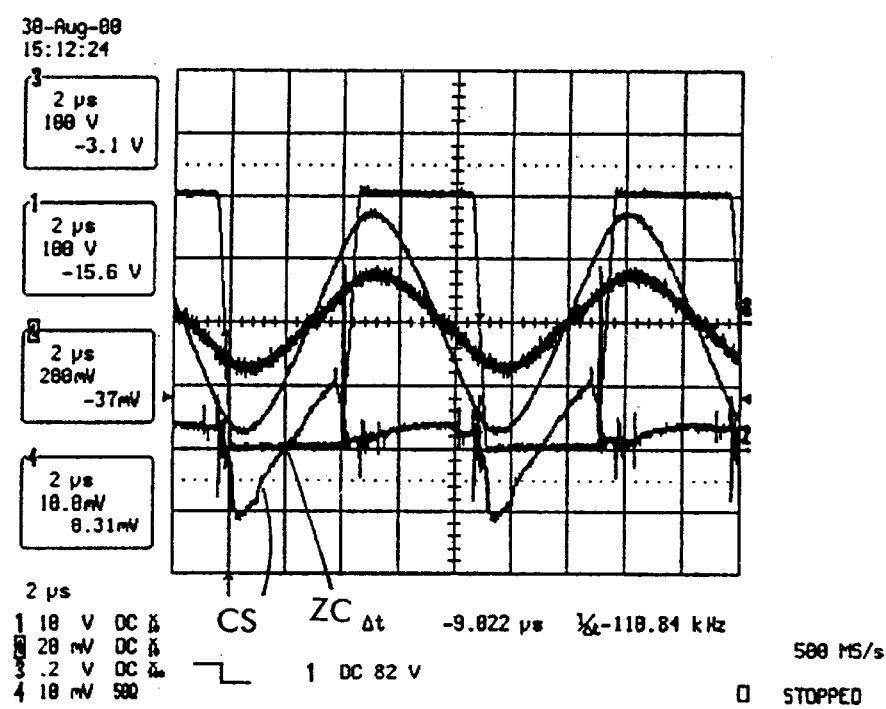
FIG. 6 Lamp Voltage, Lamp current (1A/div), VS and CS during 50% dimming

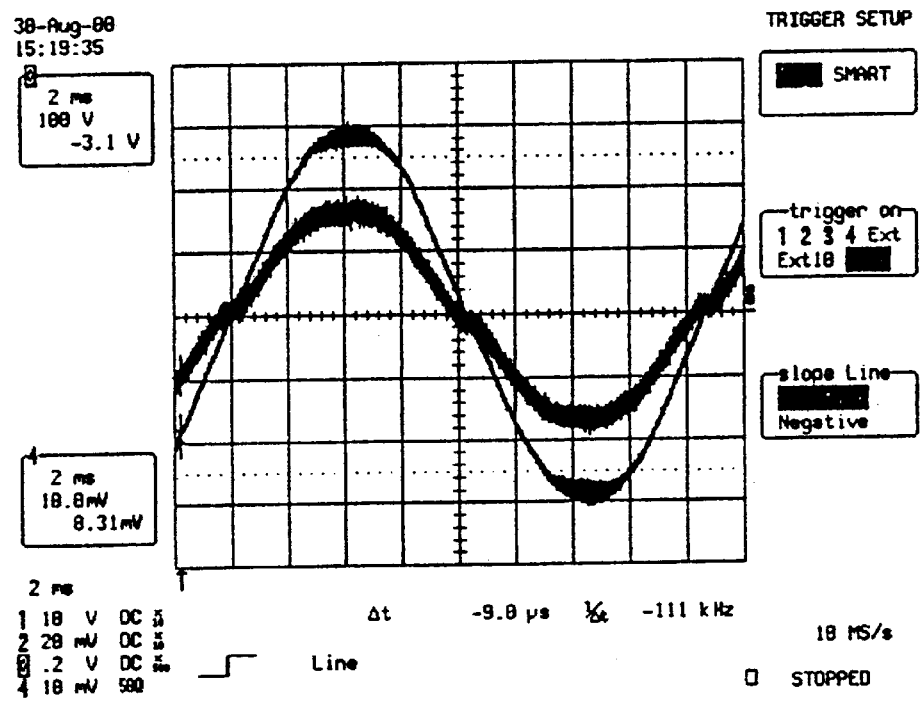
FIG. 7 Line input voltage and line input current (1A/div) during 100% brightness
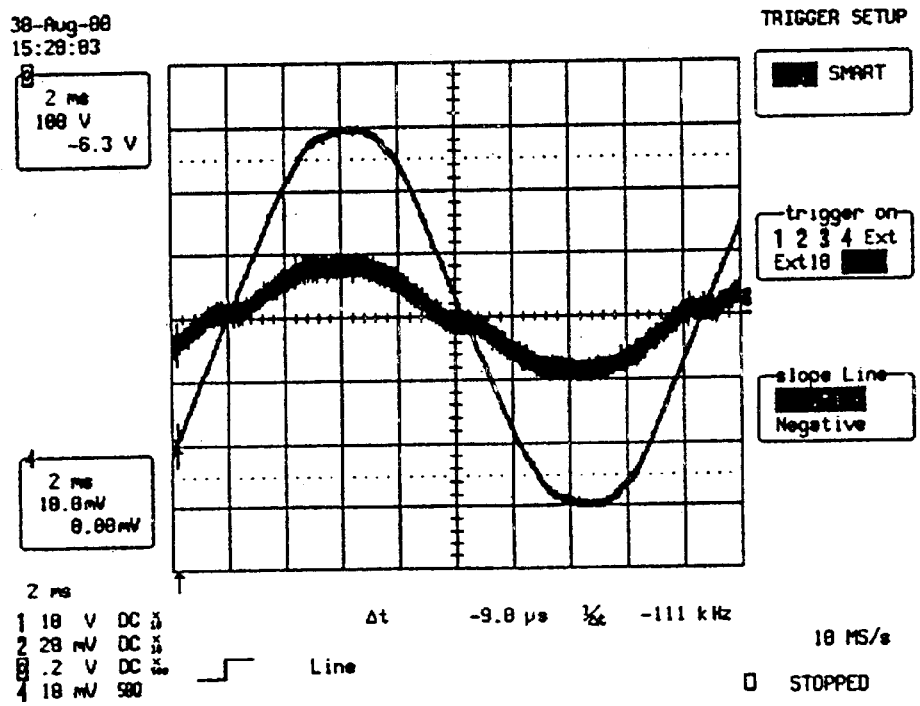
FIG. 8 Line input voltage and line input current (1A/div) during 50% brightness

ELECTRONIC DIMMABLE BALLAST FOR HIGH INTENSITY DISCHARGE LAMP

CROSS REFERENCE TO RELATED APPLICATION

The present application claims the benefit and priority of U.S. Provisional Application Ser. No. 60/277,636 filed Mar. 22, 2001 and entitled "DIMMABLE HID BALLAST CONTROL CIRCUIT", the entire disclosure of which is incorporated by reference herein.

BACKGROUND OF THE INVENTION

The present invention relates to a dimmable ballast for a high intensity discharge (HID) lamp, for example, a metal halide HID lamp. The design of electronic ballasts for HID lamps needs to take into consideration that HD lamps have different characteristics than other gas discharge lamps, e.g., fluorescent lamps. In particular, HID lamps have higher ignition voltages, typically 3 Kv peak to peak. Fluorescent lamps have ignition voltages of typically 1 Kv peak to peak. HID lamps have no filaments, so there is no need to preheat filaments. Electronic ballasted fluorescent lamps are typically operated at 30–50 KHz. HID lamps have been operated at these frequencies also, but acoustic resonance often occurs which can cause damage to the lamp due to arcing and often even cause the lamp to explode. As a result, HID lamps are typically operated at lower frequencies in the few 100 Hz range to avoid acoustic resonance. At these low frequencies larger full bridge switching circuits are employed to drive the HID lamp with a square wave without resonant output circuits.

In addition, HID lamps in the prior art are typically ignited with a single pulse starter, leading to reliability problems, as the lamps may fail to strike with such single pulse igniters. Further, when HID lamps are hot, the ignition voltage rises to much higher levels, for example, on the order of 25 kilovolts or so.

These characteristics require that the ballasts for such HID lamps have different characteristics than the ballasts for typical fluorescent lamps. In addition, HID lamps have typically only two connections whereas fluorescent lamps typically have four connections with two of the connections being for the lamp filament. An example of a dimming ballast for a fluorescent lamp is shown in U.S. Pat. No. 6,008,593 assigned to the assignee of the present application.

SUMMARY OF THE INVENTION

The invention relates to a fully functional dimming ballast for an HID lamp, for example a metal halide HID lamp. The design includes an EMI filter, a rectifier, an active power factor control stage, ballast output stage, ballast control stage and additional timing circuitry for multiple ignitions. The ballast control stage is used to regulate lamp power, set the minimum and maximum brightness levels and protect the ballast against conditions such as lamp strike failures, low DC bus level, thermal overload or lamp failure during normal operation. When compared to conventional HID ballasts, the present invention has advantages in that it allows dimming and thus energy savings, higher reliability because a single pulse igniter is not used or required, high efficiency (increased lumens/watt), easy adaptability to different lamp types and is lower in weight and size and cost. In addition, because the lamp is operated at high frequencies above 50 kHz, and preferable above 100 kHz, acoustic resonance is not a problem and component size is reduced.

According to one aspect, the invention comprises a dimmable electronic ballast for an HID lamp comprising: a rectifier stage for rectifying an AC input and providing a rectified DC output, a power factor correction stage for modifying a power factor of said AC input and for providing an increased voltage DC output from said rectified DC output, an electronic ballast control circuit for providing a driving signal comprising a pulse train for controlling a switching operation of an output switch stage driving the HID lamp; said output switch stage comprising at least one electronic switching element coupled to said increased voltage DC output for providing a pulsed power signal to the HID lamp to power the lamp, said electronic ballast control circuit having a feedback input comprising a signal related to the power dissipated by said HID lamp for maintaining said power at a desired level, the desired level being set by a dimming control input to said electronic ballast control circuit.

Preferably, a multiple pulse ignition timing circuit is provided for more reliable lamp ignition.

According to another aspect, the invention comprises a dimmable electronic ballast for an HID lamp comprising, a rectifier stage for rectifying an AC input and providing a rectified DC output, a boost stage for providing an increased voltage DC output from said rectified DC output, an electronic ballast control circuit for providing a driving signal comprising a pulse train for controlling a switching operation of an output switch stage driving the HID lamp; and said output switch stage comprising at least one electronic switching element coupled to said increased voltage DC output for providing a pulsed power signal to the HID lamp to power the lamp, said electronic ballast control circuit having a feedback input comprising a signal related to a phase angle of one of the voltage across said HID lamp and a phase angle of the current through the HID lamp for maintaining the power dissipated by said HID lamp at a desired level, the desired level being set by a dimming control input to said electronic ballast control circuit.

Other features and advantages of the present invention will become apparent from the following detailed description.

BRIEF DESCRIPTION OF THE DRAWING(S)

The invention will now be described in the following detailed description with reference to the drawings in which:

FIG. 3 shows wave forms of lamp voltage, ballast control circuit shutdown pin and ignition timing circuit counter pulses during non-strike pulsing;

FIG. 4 shows the lamp voltage in the non-strike waiting period between lamp pulses;

FIG. 5 shows waveforms of the lamp voltage, lamp current, output voltage from the output switch stage driving the lamp resonant circuit and a current sense voltage during 100% brightness;

FIG. 6 shows wavesforms of the lamp voltage, lamp current, output switch stage voltage and current sense voltage during 50% dimming;

FIG. 7 shows the AC line input voltage and line input current at 100% brightness; and FIG. 8 shows the AC line input voltage and line input current at 50% brightness.

DETAILED DESCRIPTION OF EMBODIMENTS OF THE INVENTION

Figure 1:
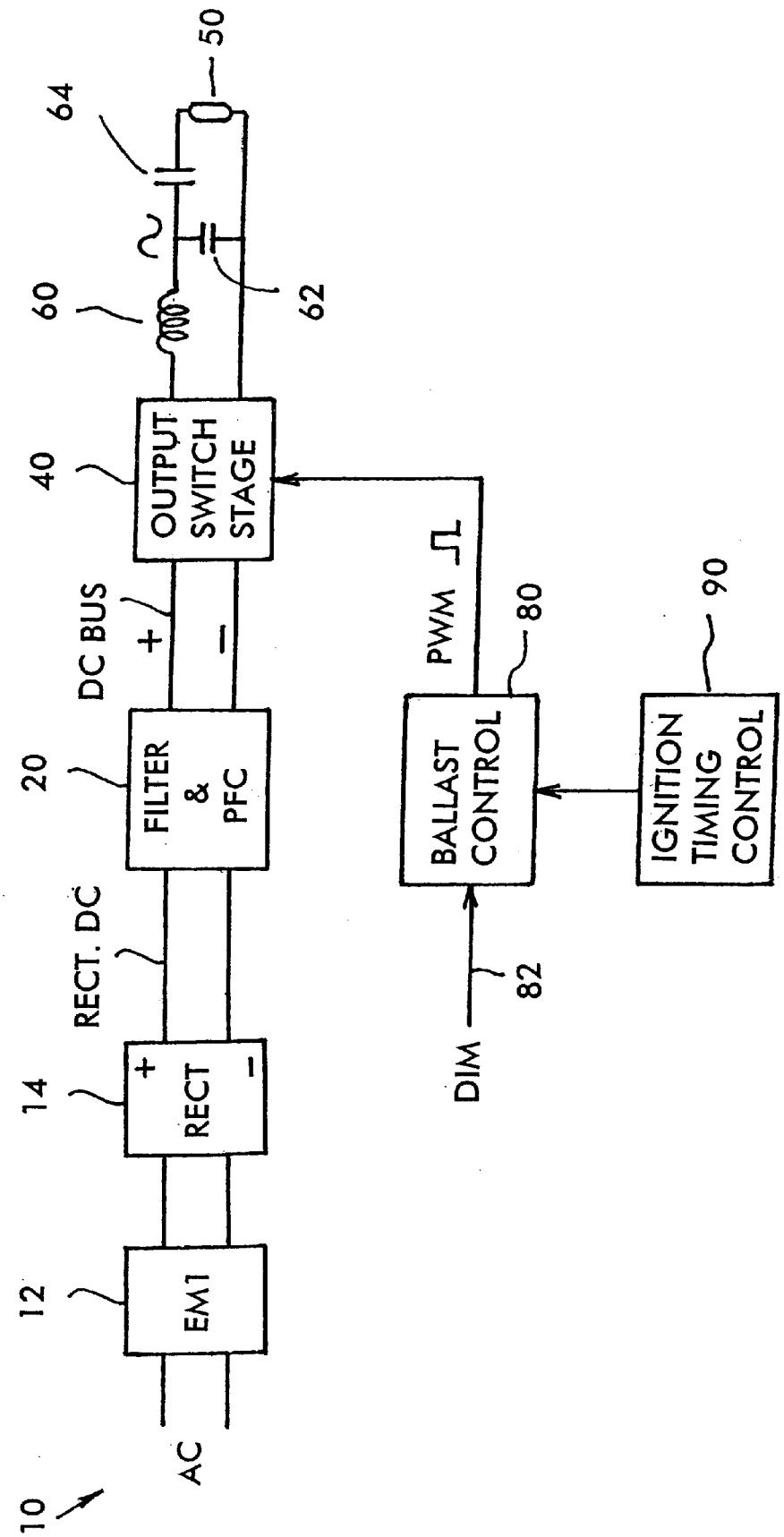
FIG. 1 shows a block diagram of the circuit according to the invention.

With reference now to the drawings, FIG. 1 shows the basic block diagram of the circuit according to the invention. The dimmable ballast for an HID lamp includes connections 10 to an AC input, for example, 120 to 240 volts AC input. The AC input is filtered by an electromagnetic interference (EMI) filter stage 12, which may comprise suitable capacitive and inductive components well known to those of skill in the art for minimizing EMI. The AC input, after EMI filtering, is provided to a rectifier stage 14 which may comprise a full wave rectifier. The rectified DC output from the rectifier 14 is provided to a filter and power factor correction stage 20, which filters the rectified DC from the rectifier 14, corrects the power factor and boosts the rectified voltage level to a DC bus voltage level of approximately 400 volts or so. The power factor correction circuitry 20 is well known to those of skill in the art. The circuitry includes a boost converter including a boost converter electronic switch, inductor and storage capacitor for wave-shaping and boosting the voltage from rectifier 14 to the DC bus voltage. Further, the PFC circuit shapes the current wave form to achieve a power factor at the AC line of approximately 1. Typically, the power factor is in the range of 0.97 to 0.99. In the instant application relating to an electronic ballast for an HID lamp, the PFC stage will provide wave shaping such that a power factor of 0.99 voltage leading is attained.

The DC bus voltage is fed to an output switch stage 40 which includes at least one electronic switch which switches the DC bus voltage across the lamp 50, through a resonant LC circuit including a resonant inductance 60, resonant capacitance 62 and series isolating capacitance 64. The LC circuit shapes the pulse width modulated output from the output stage into an approximate sinusoidal signal for driving the lamp 50. Voltage peak levels across the lamp are approximately 1 Kv. The operating frequency is high, above 50 kHz, and preferably above 100 kHz. The high frequency appears to eliminate the acoustic resonance that occurs in prior art circuits operating at lower frequencies in the 25 to 40 kHz range. The lamp 50 may be a metal halide HID lamp, for example a 250 watt metal halide HID lamp. Although a circuit diagram will be shown in FIG. 2 which has been tailored specifically to such a lamp, the basic principles apply to HID lamps of various types and power outputs.

Output stage 40 is controlled by a ballast control circuit 80. The ballast control circuit provides pulse width modulated driver signals to the output stage 40 to control the switching operation of the output stage. The ballast control circuit 80 includes a dimming input 82 and receives another input from an ignition timing circuit 90. The purpose of the ignition timing circuit 90 is to modulate and control the lamp power pulses applied to the lamp during ignition, and in the event that the lamp does not ignite, to provide a waiting period to allow the lamp to cool down before ignition pulses are again provided to start the lamp. As discussed, hot HID lamps will not restrike at cold lamp ignition voltage levels. The timer circuit 90 provides multiple ignition pulses separated by a wait period. By waiting until the lamp has cooled, the need for producing very high hot restrike voltages has been eliminated. Also, because multiple ignition pulses are provided, greater reliability in striking is achieved, and the lamp will strike more reliably at lower voltages around 1 Kv.

The overall design shown in FIG. 1, including the series inductance 60, the parallel capacitance 62 and lamp resonant circuit 64, 50 provides a topology that allows for ignition and dimming operating points to be fulfilled while operating at high frequency for a good efficiency. The power factor correction circuit 20 is preferably a boost-type converter running in critical continuous conduction mode, although other circuits can be employed, e.g., a voltage doubled, etc. The circuit to be described in FIG. 2 has been designed for operation specifically at 220 volts AC so that the peak power factor correction currents are therefore manageable in the PFC boost converter FET M3 and inductor L3 such that the running temperatures are not too high.

Figure 2:
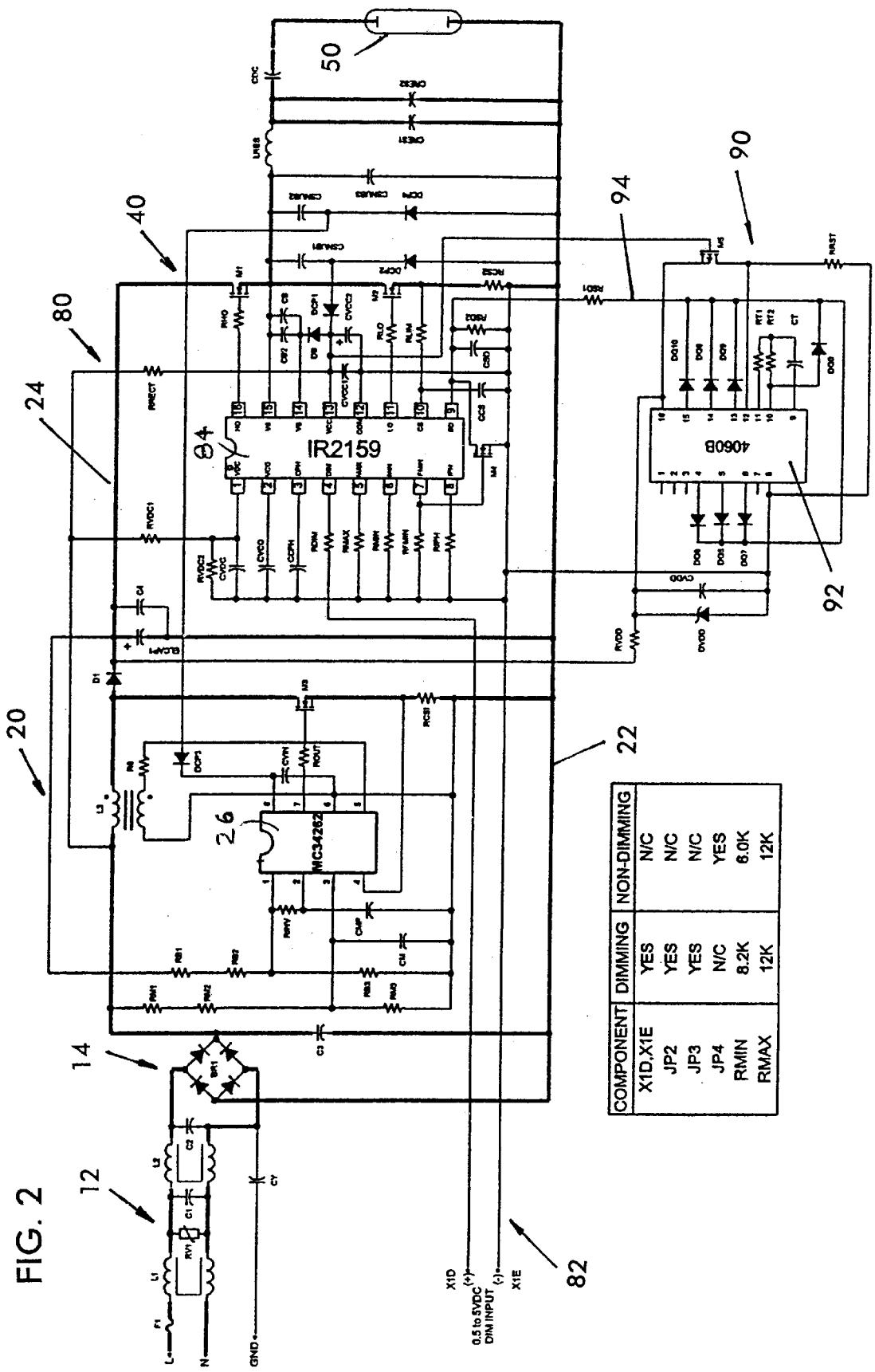
FIG. 2 is a schematic diagram of the circuit according to the invention.

FIG. 2 shows a detailed schematic diagram of the circuit of the invention. The circuit includes an EMI filter 12 comprising inductances L1 and L2 and capacitors C1, C2 and CY. The output of the EMI filter is fed to the full wave rectifier 14. The output of the rectifier 14 is provided to a filter capacitor C3, in known fashion. The filtered DC voltage from the rectifier is provided to a first DC bus comprising positive and negative rails 21 and 22. An inductance L3 and isolating diode D1 connect the positive rail 21 to an increased voltage positive rail 24 and form part of a power factor correction stage and boost converter 20. The power factor correction stage 20 includes a power factor correction control integrated circuit 26 which is well known to those of skill in the art operating to switch a boost converter switch M3 which may comprise a MOSFET. The MOSFET is provided in series with a current sense resistor RCS1 which provides a current sense signal to the power factor correction integrated circuit 26. The integrated circuit 26 is also provided with a control input through resistor R6 from a secondary of a transformer comprising an inductance L3. Inductance L3 functions to store charge when transistors M3 switches on. When M3 switches off, current from the inductor L3 generated by the high induced voltage is delivered to storage capacitor ELCAP1, which provides the boost voltage. L3 also functions as a current transformer sense for the PFC circuit. A low voltage supply voltage for powering IC26 is provided from the output stage by the line including diode DCP3. This is part of a charge pump supply. The charge pump power supply for IC26 includes the diodes DCP3 and DCP4 as well as capacitors CSNUB2 and CVIN. It provides a charge accumulated across capacitor CSNUB2 to IC26 to supplement a voltage supply provided from resistors RB1 and RB2 from the DC bus. Similarly, IC84, the ballast control IC, is provided a supply voltage VCC via resistor RRECT and a charge pump comprising diodes DCP1 and DCP2 and capacitors CSNUB1, CVCC1 and CVCC2.

The operation of the power factor correction stage and boost converter will not be described in detail herein as such power factor correction stages and boost converters are well known to those of skill in the art. The purpose of the power factor correction stage 20 is to boost the DC bus voltage and suitably shape the waveform so that a high AC input power factor is achieved, typically a power factor of 0.99 and, in this case, 0.99 voltage leading, since the electronic ballast for the HID lamp is slightly inductive.

The DC bus voltage (typically approximately 400V) across the rails 24 and 22 is provided to an output switch stage 40 comprising two electronic switching elements M1 and M2 arranged in a half bridge configuration, as well known to those of skill in the art. A current sense resistor RCS2 is provided in series with the electronic switching elements M1 and M2, which may be a pair of MOSFETS. The output of the output switch stage is provided at the common connection point of the two switching transistors M1 and M2 which is the voltage VS, to be described later with reference to the voltage waveforms. The voltage VS comprises a pulse width modulated pulse train which is fed through an LC circuit to the lamp 50. The LC circuit includes a resonant inductance LRES and resonant capacitance comprising a resonant capacitance CRES shown in FIG. 2 as two parallel capacitances CRES1 and CRES2, as well as a series blocking capacitance CDC. The LC circuit, as well known to those of skill in the art, is resonant at the ballast operating frequency and shapes the voltage VS into an approximately sinusoidal shape. The typical peak voltage is about 1 Kv.

The ballast control stage 80 includes a ballast control integrated circuit 84 which may be an IR2159 type device. The control IC 84 includes pins for providing various inputs as well known to those of skill in the art, including pins 1 and 2 labeled VDC and VCO. Pin VCO is coupled to capacitive and resistive components for controlling the oscillation frequency of the voltage controlled oscillator (VCO) in the integrated circuit 84 for controlling the output frequency. Pin VDC operates as line input voltage detection and is coupled through resistor RVDC1 to the rectified DC at rail 21. It is internally connected to under voltage/fault detection circuitry in IC84. Pin DIM is coupled through a resistor RDIM to a dimming input 82 which, in the embodiment described, comprises a variable DC supply for controlling the level of dimming. In particular, the dimming supply varies between 0.5 volts to 5 volts DC to provide the dimming range.

Pins MAX and MIN control the maximum and minimum lamp power settings, respectively, as determined by resistors RMAX and RMIN. Pin FMIN controls the minimum frequency setting as is determined by a resistor RFMIN. The various capacitive and resistive circuit components described are connected to the signal common which is coupled to the DC bus negative rail 22. The inputs for preheat are not necessary for HID lamps, as HID lamps have no filament and thus no preheat requirement. These inputs are appropriately tied low by suitable resistive/capacitive components.

Additional inputs and outputs of the control IC 84 include the high HO and low LO side outputs driving the electronic switching elements M1 and M2, respectively, the floating return VS coupled to the output of the output switch stage 40, and the high side gate driver floating supply VB. VCC comprises the voltage supply for the integrated circuit 84, and COM comprises the integrated circuit power and signal ground. A current sensing input CS to be described in greater detail below and a shut down input SD, also to be described in greater detail below, are also provided.

The electronic ballast control circuit 80, in known fashion, provides outputs at pins HO and LO to drive the electronic switches M1 and M2 alternatingly to provide power signal VS to the lamp resonant circuit.

In accordance with the present invention, the ballast control circuit 80 provides phase control dimming based upon dimming input 82. The current sensing resistor RCS2 in series with the electronic switches M1 and M2 of the output switch stage 40 provides a current sense signal through a resistor RLIM to the current sense input CS of the integrated circuit 84. FIG. 5 shows the lamp voltage 100, lamp current 110, output signal VS driving the lamp resonant circuit and the input CS to the integrated circuit 84 at 100% brightness level.

The integrated circuit 84 operates to sense the zero crossing of the signal CS. The zero crossing is proportional to the phase angle of the lamp current. As shown in FIG. 5, the voltage VS comprises the output of the output switch stage. When VS is high, the high side device M1 is on and the low side device M2 is off. When VS is low, the high side device M1 is off and the low side device M2 is on. As shown in FIG. 5 by the half cycle of VS when the high side device is off and the low side device is on (portion A), the input to the CS PIN comprises a rising voltage waveform which has a zero crossing Zc. There is a relationship between the phase angle of the current through the sense resistor RCS2 and the lamp power. The greater the phase angle, the lower the lamp power, as the voltage and current are more out of phase, resulting in reduced real power. At a phase angle of 90°, no power is delivered to the lamp. The brightness is 0. The current in the output switch stage and thus in the sense resistor RCS1 equals the current through the resonant inductor LRES, which is equal to the sum of the currents in the lamp 50 and the resonance capacitor CRES. The phase angle of the lamp current with respect to the voltage across the lamp is related to the lamp power and the phase angle is directly related to the zero crossing of the voltage CS. When the phase angle changes, the zero crossing of the voltage CS at the CS input of the integrated circuit 84 will shift. As the phase angle, and thus the zero crossing, moves toward 0 degrees, brightness is increased. As shown in FIG. 5, as the zero crossing of CS is shifted to the left of the VS half cycle, i.e., closer to the beginning of the cycle of VS, the higher the brightness level. The current and voltage are more in phase. FIG. 5 shows waveforms of the circuit of FIG. 2 during 100% brightness, which corresponds to a phase angle of about 60°. In contrast, FIG. 6 shows the same waveforms at 50% dimming, and as can be seen from the waveforms, the zero crossing in FIG. 6 is closer to 50% of a half cycle i.e., one quarter the cycle of the waveform VS (or closer to 90°), equivalent to a lower brightness level, and in the instance shown, 50% dimming.

As discussed, the integrated circuit 84 operates by sensing the location of the CS zero crossing. This provides a closed loop feedback control to maintain the lamp brightness at the desired dimming level as set by the dimming input 82. As the zero crossing of voltage CS varies, the control 80 will vary the frequency of the HO and LO drive outputs and thus vary the frequency of the waveform ES provided to drive lamp 50. In particular, IC 84 operates such that the dimming control 82 provides a DC voltage which sets a phase reference. A phase detector in IC 84 compares the reference phase and the phase of the output stage current as determined by the zero crossing of voltage CS, and produces an error signal proportional to the difference. The difference signal forces a VCO of IC 84 to steer the output frequency in the proper direction (increase frequency to dim, decrease frequency to brighten). The error is forced to zero, thus attaining and maintaining the desired brightness set by control 82. Further details of operation of IC84 can be found in the International Rectifier Preliminary Data Sheet No. PD60169D-IR2159(S) Dimming Ballast Control IC. The IC84 thus achieves phase control dimming of the HID lamp. The greater the phase angle, the less the real power delivered to the lamp, and thus the brightness is decreased. Conversely, the smaller the phase angle, the greater the real power delivered to the lamp and the higher the brightness level.

As discussed above, HID lamps will typically not restart when they are hot. Accordingly, to address this problem and also to increase starting reliability, a timing circuit 90 has been provided which comprises a binary counter integrated circuit 92 whose selected bit outputs are coupled through diodes DQ0 and DQ5–DQ10 to a common output 94 which is coupled through a resistor RSD1 to the pin SD (shut down) of the controller IC84. The purpose of the circuit 90 is to provide a series of pulses, shown in FIG. 3 by waveform 98, to the SD pin of the control IC84. These pulses 98 include a first limited number of pulses 98A which are provided initially to the SD pin. This will control the lamp voltage applied to the lamp 50 by interrupting the lamp voltage as shown by the waveform 120 of FIG. 3. Accordingly, the lamp voltage is modulated at the frequency determined by the repetition rate of pulses 98A provided to the SD pin of the integrated circuit 84. Depending upon which bit outputs of the counter integrated circuit 92 are selected for connection through the diodes to line 94, a limited number of pulses 98A can be provided on line 94 before a more significant output bit of the counter IC 92 goes high and stays high to provide a steady shutdown signal as indicated at 98B in FIG. 3. Once this occurs, the operation of the ballast control integrated circuit 84 ceases, and the switching transistors M1 and M2 cease switching for a waiting period 121 (FIG. 4) and no output voltage is provided to the lamp 50.

FIG. 4 shows the waiting period 121 between pulses 120 of the lamp voltage (on a greatly reduced time scale) when the signal on line 94 goes high as determined by the steady shutdown signal 98B. Accordingly, if the lamp fails to ignite, for example, when the lamp is hot, the control IC will shutdown for a waiting interval, for example, as shown in FIG. 4, for a 5 minute interval, before burst pulses are again applied to the lamp. After the waiting interval has terminated, the most significant bit of the counter IC coupled to the line 94 will again go low, allowing burst pulses to again be applied to the line 94 by the counter integrated circuit 92. If the lamp has sufficiently cooled down, ignition will then occur. Otherwise, the cycle repeats until the lamp strikes. As discussed above, the counter circuit 92 provides the two time intervals, i.e., the time interval during the limited number of pulses 98A and the interval of the steady shutdown signal 98B as shown in FIG. 4. Once the waiting period has terminated, a limited number of burst pulses 98A will again be provided on line 94 to the shutdown pin SD to pulse the lamp voltage waveform again as shown in FIG. 3 at 120. Thus, the circuit 90 provides two time periods, a first time period when circuit 90 operates to modulate the high frequency output voltage provided to the lamp for a limited number of burst pulses and a second time period comprising a wait period before the lamp is again pulsed to allow the lamp to cool down. During the wait period, the lamp will cool down and may strike when lamp voltage pulses are reapplied.

In a preferred implementation, the SD pin is burst pulsed at approximately 1 second intervals before going into the steady shutdown mode as shown at 121 in FIG. 4. The steady shutdown mode may comprise a time period of, for example, 300 seconds. In addition, a normal ballast operating frequency i.e., the output voltage frequency applied to the lamp, may be approximately 120 kilohertz. During the ignition pulsing shown in FIG. 3 by waveform 98, the lamp voltage frequency ramps down to approximately 80 kilohertz. Further, as shown by waveform 120 in FIG. 3, during the period X the ignition voltage ramps up over a series of lamp voltage pulses over a period of 10 milliseconds before it is clamped at approximately a voltage level of 1 kilovolt. The provision of multiple ignition pulses allows for more reliable, lower voltage starting of the lamp, for example, at about 1 Kv. The ramp-up of the multiple ignition pulses also assists in achieving more reliable ignition.

As shown in FIG. 2, an electronic switch M4 is also provided to disable shutdown of the integrated circuit 84 during normal operation. When the gate of transistor M4 is high, SD will be held low even though counter 92 provides pulses on line 94. Accordingly, when the lamp strikes, the potential at FMIN of control IC84 will prevent the pulse signal on line 94 from shutting down the control IC84.

Also provided is a reset circuit comprising transistor M5. Transistor M5 may be a PMOS FET. Its gate is coupled to VCC. Its source is connected to the voltage supply VDD for the counter integrated circuit 92. This voltage source VDD is connected through a resistor RVDD to the DC bus rail 24. The voltage VDD is clamped by a zener diode DVDD to a preset voltage less than the voltage VCC. Accordingly, at startup, as voltage VCC rises and as is still below VDD, the MOSFET M5 will be on, providing a voltage level across resistor RRST, thereby providing a voltage input to reset pin 12 of integrated circuit 92, holding the counter IC 92 in a reset mode. As soon as VCC rises above voltage VDD, MOSFET M5 goes off and the reset level on pin 12 of integrated circuit 92 goes to zero, thus enabling the counter to begin counting and providing pulses on line 94. The purpose of the reset transistor M5 is to ensure that the counter IC 92 starts in a defined manner when the ballast is turned on. This will prevent the counter IC 92 from being in the wait mode 121 as shown in FIG. 4 upon startup of the ballast.

FIGS. 7 and 8 show the AC line voltage and AC line input current for 100% brightness and 50% brightness, respectively. With the power factor correction approaching 0.99, the AC voltage and current input waveforms are substantially in phase. As the lamp is at 50% brightness, the AC input current waveform is substantially reduced in magnitude as shown in FIG. 8.

A listing of circuit components and values can be found in the provisional application upon which priority is claimed.

The present invention accordingly achieves a high AC line power factor correction and provides efficiency in providing power to an HID lamp. In addition, it avoids acoustic resonance problems by operating at high frequencies, above 50 kHz and preferably above 100 kHz. The use of high frequencies also allows for a more compact half-bridge switching output stage and reduces the size of the resonant output stage. Thus, the invention uses a different approach than the prior art, which typically used low frequencies (about a few 100 Hz) to power HID lamps, in order to avoid acoustic resonance problems. The invention avoids these problems by using high frequencies (above 50 kHz and preferably above 100 kHz) instead.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A dimmable electronic ballast for an HID lamp comprising:
   a rectifier stage for rectifying an AC input and providing a rectified DC output;
   a power factor correction stage for modifying a power factor of said AC input and for providing an increased voltage DC output from said rectified DC output;
   an electronic ballast control circuit for providing a driving signal comprising a pulse train for controlling a switching operation of an output switch stage driving the HID lamp, said electronic ballast control circuit including a feedback input to sense a current flow through said HID lamp and a dimming control input to set a desired power level, said electronic ballast control circuit being configured to maintain an actual power of said HID lamp at the desired power level in accordance with a zero crossing of the current flow through said HID lamp, the zero crossing being proportional to a phase angle of the current flow through said HID lamp; and said output switch stage comprising at least one electronic switching element coupled to said increased voltage DC output for providing a pulsed power signal to the HID lamp to power the lamp.

2. The dimmable electronic ballast of claim 1, wherein said feedback input comprises a voltage proportional to a current in said output switch stage.

3. The dimmable electronic ballast of claim 1, wherein the output switch stage comprises a half bridge output stage comprising a pair of series connected electronic switching elements, said electronic ballast control circuit providing a pair of pulse width modulated drive signals to respective ones of said electronic switching elements.

4. The dimmable electronic ballast of claim 3, wherein the pair of electronic switching elements comprise a high side device connected to a positive rail of said high voltage DC output and a low side device connected to a negative rail of said high voltage DC output, the high side device and low side device being coupled together at a common connection and said pulsed power signal for the HID lamp being provided from said common connection.

5. The dimmable electronic ballast of claim 4, further comprising a current sense resistor in series with said electronic switching elements for providing a feedback signal to said electronic ballast circuit related to the power dissipated by said lamp.

6. The dimmable electronic ballast of claim 1, wherein said signal related to the power dissipated by the HID lamp comprises a signal wherein the phase angle of the current is related to the power dissipated in the HID lamp.

7. The dimmable electronic ballast of claim 6, wherein the signal wherein the phase angle of the current is related to the power dissipated by the lamp comprises a signal related to the current in the output switch stage.

8. The dimmable electronic ballast of claim 7, wherein the signal related to the current in the output switch stage comprises a signal having zero crossings directly related to the phase angle of the current in the output stage and proportional to the power dissipated by the lamp.

9. The dimmable electronic ballast of claim 8, wherein the signal related to the current in the output switch stage is generated as a voltage across a sense resistor in series with the at least one electronic switch in the output switch stage.

10. The dimmable electronic ballast of claim 1, further comprising an LC circuit coupled between said output switch stage and the HID lamp for filtering said pulsed power signal into an approximate sinusoidal power signal for the lamp.

11. The dimmable electronic ballast of claim 10, further comprising a shut down inhibit circuit for inhibiting shut down during normal operation of said lamp.

12. The dimmable electronic ballast of claim 1, wherein said dimming control input is coupled to a variable DC voltage to thereby control the dimming level of said HID lamp.

13. The dimmable electronic ballast of claim 1, wherein the power factor correction stage comprises a power factor correction control circuit controlling a boost converter comprising a further electronic switch coupled in series with an inductance and connected to the increased voltage DC output by an isolating diode.

14. The dimmable electronic ballast of claim 13, further comprising a storage capacitor coupled to said isolating diode to store said increased voltage DC output.

15. The dimmable electronic ballast of claim 13, wherein the power factor correction control circuit receives an input from a current sensor coupled between said rectified DC output and said further electronic switch.

16. The dimmable electronic ballast of claim 15, wherein the current sensor comprises a current transformer having a primary and a secondary, the primary comprising said inductance and said secondary coupled to said power factor correction circuit as an input.

17. The dimmable electronic ballast of claim 1, further comprising an EMI filter coupling said AC input to said rectifier stage.

18. The dimmable electronic ballast of claim 1, wherein said pulsed power signal to the lamp powers said lamp at a frequency above 50 kHz.

19. The dimmable electronic ballast of claim 18, wherein said pulsed power signal to the lamp powers said lamp at a frequency above 100 kHz.

20. A dimmable electronic ballast for an HID lamp comprising:

a rectifier stage for rectifying an AC input and providing a rectified DC output;

a power factor correction stage for modifying a power factor of said AC input and for providing an increased voltage DC output from said rectified DC output;

an electronic ballast control circuit for providing a driving signal comprising a pulse train for controlling a switching operation of an output switch stage driving the HID lamp;

said output switch stage comprising at least one electronic switching element coupled to said increased voltage DC output for providing a pulsed power signal to the HID lamp to power the lamp;

said electronic ballast control circuit having a feedback input comprising a signal related to the power dissipated by said HID lamp for maintaining said power at a desired level, the desired level being set by a dimming control input to said electronic ballast control circuit; and a timing circuit for providing a pulsed timing signal to said electronic ballast control circuit during HID lamp ignition, whereby the pulsed timing signal repeatedly shuts down said electronic ballast control circuit to thereby provide pulses of the driving signal of the electronic ballast control circuit in synchronism with the pulsed timing signal.

21. The dimmable electronic ballast of claim 20, wherein the pulsed timing signal comprises a limited number of pulses, said timing signal providing a steady shut down signal to the electronic ballast control circuit after said limited number of pulses if the lamp does not ignite.

22. The dimmable electronic ballast DEB of claim 21, wherein said steady shut down signal terminates after a wait time period and said limited number of pulses of said pulsed timing signal resumes.

23. The dimmable electronic ballast of claim 22, wherein said steady shut down signal is of such a duration to allow said HID lamp to cool down to enable ignition of said lamp when said limited number of pulses resume.

24. The dimmable electronic ballast of claim 20, wherein each pulse of the pulsed timing signal causes a burst of said pulsed power signal to be provided to the lamp, said burst having an envelope comprising a ramp up to a peak value.

25. The dimmable electronic ballast of claim 20, further comprising a reset circuit for keeping said timing circuit in the reset state until after said electronic ballast control circuit has started providing said pulsed power signal.

26. A dimmable electronic ballast for an HID lamp comprising:
- a rectifier stage for rectifying an AC input and providing a rectified DC output;
- a boost stage for providing an increased voltage DC output from said rectified DC output;
- an electronic ballast control circuit for providing a driving signal comprising a pulse train for controlling a switching operation of an output switch stage driving the HID lamp, said electronic ballast control circuit including a feedback input to sense a voltage across said HID lamp and a dimming control input to set a desired power level, said electronic ballast control circuit being configured to maintain an actual power of said HID lamp at the desired power level in accordance with a zero crossing of the voltage across said HID lamp, the zero crossing being proportional to a phase angle of the voltage across said HID lamp; and
- said output switch stage comprising at least one electronic switching element coupled to said increased voltage DC output for providing a pulsed power signal to the HID lamp to power the lamp.

27. The dimmable electronic ballast of claim 26, wherein the boost stage comprises a power factor correction stage for modifying a power factor of said AC input.

28. The dimmable electronic ballast of claim 26, wherein the output switch stage provides the pulsed power signal to the HID lamp through a resonant LC circuit.

29. The dimmable electronic ballast of claim 28, wherein the resonant LC circuit provides power to the lamp at a frequency above 50 kHz.

30. The dimmable electronic ballast of claim 29, wherein the resonant LC circuit provides power to the lamp at a frequency above 100 kHz.

31. The dimmable electronic ballast of 26, further comprising a circuit for causing multiple bursts of pulses of said pulsed power signal to be provided the lamp during a lamp ignition period.

32. The dimmable electronic ballast of claim 31, wherein the bursts have an envelope comprising a ramp up to a peak voltage.

33. The dimmable electronic ballast of claim 31, wherein the multiple bursts are followed by a wait period, followed again by multiple bursts and a wait period, in succession.

* * * * *